(12) United States Patent
Jung et al.

(10) Patent No.: US 9,591,544 B2
(45) Date of Patent: Mar. 7, 2017

(54) METHOD FOR RESELECTING CELL IN WIRELESS COMMUNICATION SYSTEM AND APPARATUS SUPPORTING SAME

(71) Applicant: LG ELECTRONICS INC., Seoul (KR)

(72) Inventors: Sunghoon Jung, Seoul (KR); Youngdae Lee, Seoul (KR); Sungjun Park, Seoul (KR); Seungjune Yi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/442,003

(22) PCT Filed: Nov. 12, 2013

(86) PCT No.: PCT/KR2013/010247
§ 371 (c)(1),
(2) Date: May 11, 2015

(87) PCT Pub. No.: WO2014/073940
PCT Pub. Date: May 15, 2014

(65) Prior Publication Data
US 2015/0327141 A1    Nov. 12, 2015

Related U.S. Application Data

(60) Provisional application No. 61/725,426, filed on Nov. 12, 2012.

(51) Int. Cl.
*H04W 36/24* (2009.01)
*H04W 48/16* (2009.01)
*H04W 48/18* (2009.01)

(52) U.S. Cl.
CPC .......... *H04W 36/24* (2013.01); *H04W 48/16* (2013.01); *H04W 48/18* (2013.01)

(58) Field of Classification Search
None
See application file for complete search history.

(56) References Cited

U.S. PATENT DOCUMENTS

| 2006/0166694 | A1* | 7/2006 | Jeong | H04W 48/16 |
| | | | | 455/525 |
| 2006/0172741 | A1* | 8/2006 | Jeong | H04W 36/0061 |
| | | | | 455/446 |
| 2009/0088131 | A1 | 4/2009 | Gholmieh et al. | |
| 2009/0270103 | A1 | 10/2009 | Pani et al. | |
| 2010/0091719 | A1* | 4/2010 | Deshpande | H04W 8/183 |
| | | | | 370/329 |

(Continued)

*Primary Examiner* — Chirag Shah
*Assistant Examiner* — Joshua Smith
(74) *Attorney, Agent, or Firm* — Birch, Stewart, Kolasch & Birch, LLP

(57) ABSTRACT

Provided is a method for user equipment reselecting a cell in a wireless communication system. The method comprises: obtaining a public land mobile network (PLMN) list from a serving cell, wherein the PLMN list lists a plurality of PLMNs according to businesses sharing the serving cell; obtaining cell reselection information from the serving cell, wherein the reselection information includes a plurality of cell reselection information sets related to the plurality of PLMNs; and reselecting the cell based on the PLMN list and the cell reselection list.

8 Claims, 15 Drawing Sheets

(56) References Cited

U.S. PATENT DOCUMENTS

| | | | |
|---|---|---|---|
| 2010/0105380 A1* | 4/2010 | Attar | H04W 48/16 455/434 |
| 2010/0261474 A1 | 10/2010 | Gollapudi et al. | |
| 2010/0278142 A1 | 11/2010 | Dwyer et al. | |
| 2011/0263239 A1 | 10/2011 | Yamagishi et al. | |
| 2012/0157095 A1* | 6/2012 | Fodor | H04W 4/08 455/434 |
| 2013/0077517 A1* | 3/2013 | Cho | H04L 43/50 370/252 |
| 2014/0051428 A1* | 2/2014 | Jung | H04W 24/08 455/422.1 |

\* cited by examiner

METHOD FOR RESELECTING CELL IN WIRELESS COMMUNICATION SYSTEM AND APPARATUS SUPPORTING SAME

CROSS REFERENCE TO RELATED APPLICATIONS

This application is the National Phase of PCT International Application No. PCT/KR2013/010247, filed on Nov. 12, 2013, which claims priority under 35 U.S.C. 119(e) to U.S. Provisional Application No. 61/725,426, filed on Nov. 12, 2012, all of which are hereby expressly incorporated by reference into the present application.

BACKGROUND OF THE INVENTION

Field of the Invention

The present invention relates to wireless communications, and more particularly, to a method of reselecting a cell by a terminal in a wireless communication system, and an apparatus supporting the method.

Related Art

3GPP (3rd Generation Partnership Project) LTE (long term evolution) which is improvement of UMTS (Universal Mobile Telecommunications System) has been introduced as 3GPP release 8. The 3GPP LTE uses OFDMA (orthogonal frequency division multiple access) in a downlink, and uses SC-FDMA (Single Carrier-frequency division multiple access) in an uplink. The 3GPP LTE adopts MIMO (multiple input multiple output) having maximum four antennas. Recently, a discussion of 3GPP LTE-A (LTE-Advanced) which is the evolution of the 3GPP LTE is in progress.

Due to mobility of a terminal as a mobile device, the quality of a service provided to a current terminal may deteriorate or a cell that may provide a better service can be sensed. Therefore, the terminal may move to a new cell and such an operation is referred to as movement execution of the terminal. The terminal may select a cell on the same frequency, a cell on a different frequency, or a different radio access technology (RAT) cell through cell selection and/or cell reselection and move to the corresponding cell.

Meanwhile, although operators who provide wireless communication services can independently implement a communication system for providing the services, it is also possible to share systems implemented by specific operators. According to such a communication system environment, there may be a situation where a specific cell is shared by a plurality of operators.

When one cell is shared by the plurality of operators, a UE performs a cell reselection procedure by commonly applying information for the cell reselection. Therefore, a cell capable of providing an optimal service to the UE may not be selected as a target cell. As a result, a problem may occur in which quality of a service provided to the UE deteriorates. Accordingly, there is a need for a cell reselection method in which the UE can select a proper target cell through the cell reselection in an environment where the communication system can be fully or partially shared by the plurality of operators.

SUMMARY OF THE INVENTION

The present invention provides a method of reselecting a cell in a wireless communication system, and an apparatus supporting the method.

In an aspect, a method of performing cell selection performed by a terminal in a wireless communication system is provided. The method comprises obtaining a public land mobile network (PLMN) list from a serving cell, wherein the PLMN list enumerates a plurality of PLMNs based on operators sharing the serving cell, obtaining cell reselection information from the serving cell, wherein the cell reselection information includes a plurality of cell reselection information sets associated with the plurality of PLMNs and performing the cell reselection on the basis of the PLMN list and the cell reselection information.

The plurality of PLMNs may include a primary PLMN and at least one secondary PLMN. The plurality of cell reselection information sets may include one cell reselection information set associated with the primary PLMN and at least one cell selection information set associated with the at least one secondary PLMN.

The performing of the cell reselection may comprise determining a cell reselection information set associated with a registered PLMN (rPLMN) of the terminal among the plurality of PLMNs and selecting a target cell by applying the cell reselection information set associated with the rPLMN.

The determining of the cell reselection information set associated with the rPLMN of the terminal may be performed on the basis of an order according to which the plurality of PLMNs in the PLMN list are enumerated and an order according to which the plurality of cell reselection information sets in the cell reselection information are enumerated.

The method may further comprise obtaining association information. The association information may specify an association between the at least one secondary PLMN and the at least one cell reselection information set. The determining of the cell reselection information set associated with the rPLMN of the terminal may determine the cell reselection information associated with the rPLMN of the terminal by using the association information.

The at least one secondary PLMN may be associated with one cell reselection information set.

The at least one secondary PLMN and the at least one cell reselection information set may be one-to-one mapped.

The PLMN list may be transmitted by being included in system information which is broadcast by the serving cell.

The cell reselection information may be transmitted by being included in system information which is broadcast by the serving cell.

The cell reselection information may be transmitted by being included in a radio resource control (RRC) connection release message transmitted when a connection between the serving cell and the terminal is released.

In another aspect, a wireless device operating in a wireless communication system is provided. The wireless device comprises a radio frequency (RF) unit for transmitting and receiving a radio signal and a processor operatively coupled to the RF unit. The processor is configured for: obtaining a public land mobile network (PLMN) list from a serving cell, wherein the PLMN list enumerates a plurality of PLMNs based on operators sharing the serving cell, obtaining cell reselection information from the serving cell, wherein the cell reselection information includes a plurality of cell reselection information sets associated with the plurality of PLMNs and performing the cell reselection on the basis of the PLMN list and the cell reselection information.

In a cell reselection method according to an embodiment of the present invention, cell reselection information optimized not to a primary public land mobile network (PLMN) but a secondary PLMN can be additionally provided. A user equipment (UE) can perform cell reselection by selectively using cell reselection information associated with its registered PLMN (rPLMN). The UE can select and move a cell capable of providing a more proper service in comparison with the conventional cell reselection. In addition, it is possible to avoid a problem in that an additional cell movement procedure is performed due to incorrect cell selection. Accordingly, a service can be provided more effectively to the UE, and service quality of the UE can be improved.

DESCRIPTION OF EXEMPLARY EMBODIMENTS

Figure 1:
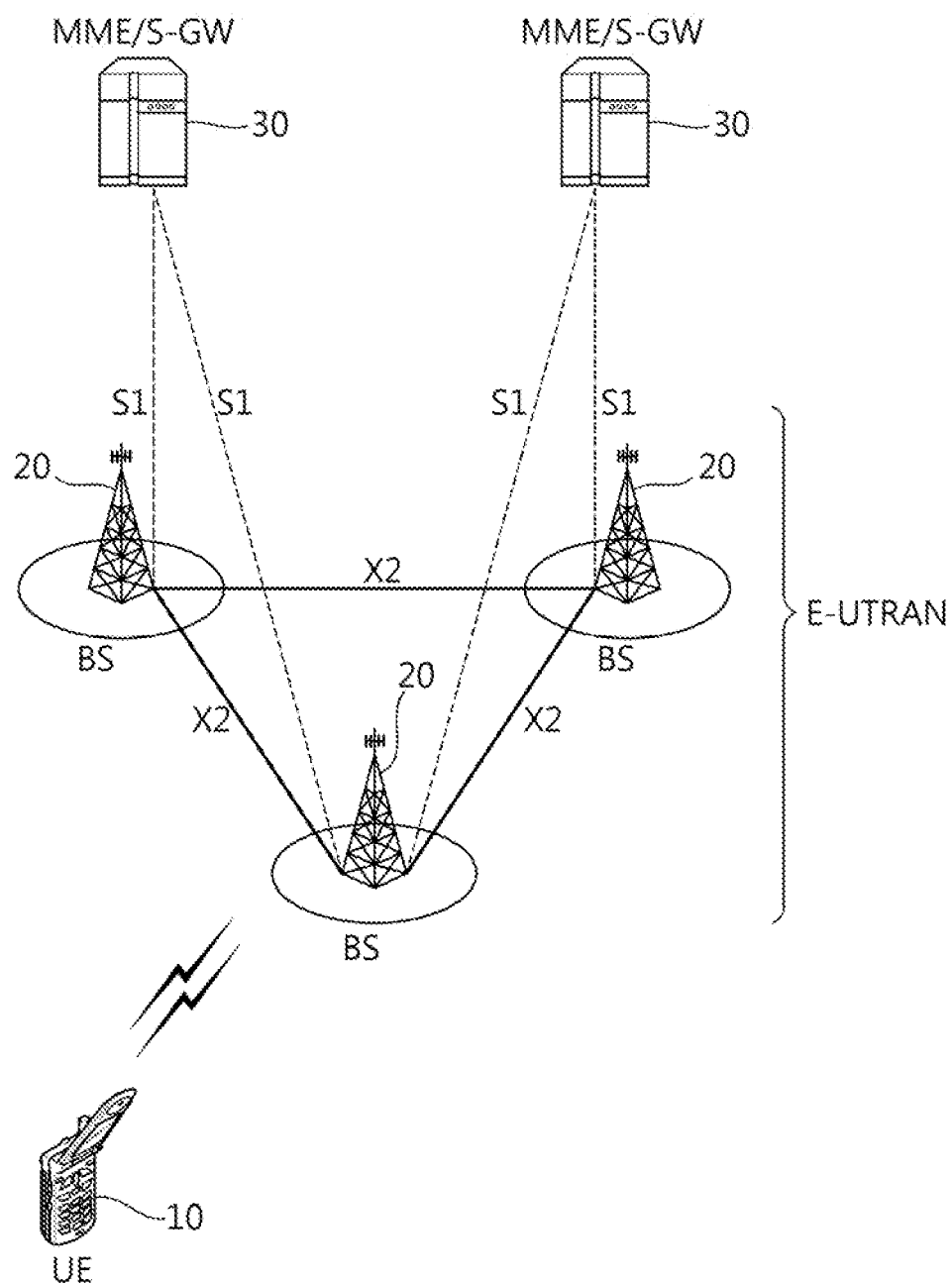
FIG. 1 illustrates a wireless communication system to which the present invention is applied.

FIG. 1 illustrates a wireless communication system to which the present invention is applied. The wireless communication system may be called an evolved-UMTS terrestrial radio access network (E-UTRAN), or a long term evolution (LTE)/LTE-A system.

The E-UTRAN includes a base station (BS) 20 which provides a control plane and a user plane to user equipment (UE) 10. The UE 10 may be fixed or have mobility, and may be referred to as other terms such as a mobile station (MS), a user terminal (UT), a subscriber station (SS), a mobile terminal (MT), and a wireless device. The BS 20 generally represents a fixed station that communicates with the UE 10 and may be referred to as other terms such as an evolved-NodeB (eNB), a base transceiver system (BTS), and an access point.

The BSs 20 may be connected to each other through an X2 interface. The BS 20 is connected with an evolved packet core (EPC) 30 through an S1 interface, and more particularly, connected with a mobility management entity (MME) through an S1-MME and a serving gateway (S-GW) through an S1-U.

The EPC 30 is constituted by the MME, the S-GW, and a packet data network-gateway (P-GW). The MME has access information of the UE or information regarding capacity of the UE, and the information is frequently used in mobility management of the UE. The S-GW is a gateway having the E-UTRAN as an end point, and the P-GW is a gateway having the PDN as an end point.

Layers of a radio interface protocol between the UE and the network may be divided into a first layer L1, a second layer L2, and a third layer L3 based on three lower layers of an open system interconnection (OSI) standard model which is widely known in the communication system, and among them, a physical layer to which the first layer belongs provides an information transfer service using a physical channel, and a radio resource control (RRC) layer positioned on the third layer serves to control a radio resource between the UE and the network. To this end, the RRC layer exchanges an RRC message between the UE and the network.

Figure 2:
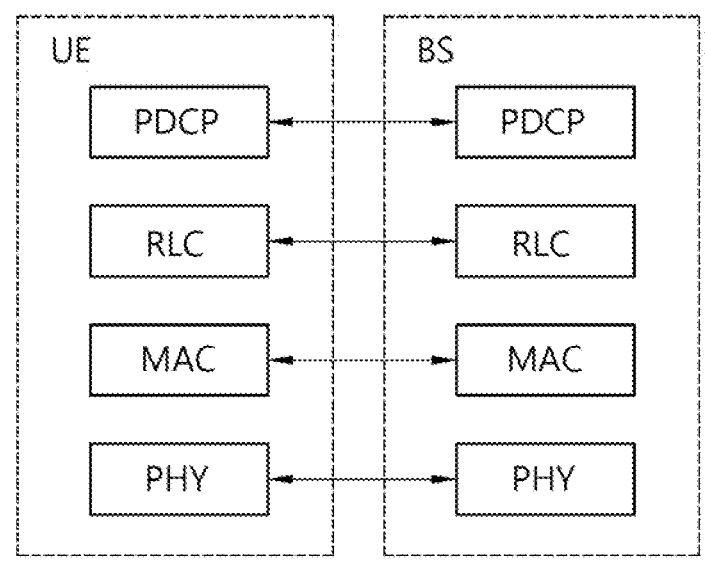
FIG. 2 is a block diagram illustrating a radio protocol architecture for a user plane.
Figure 3:
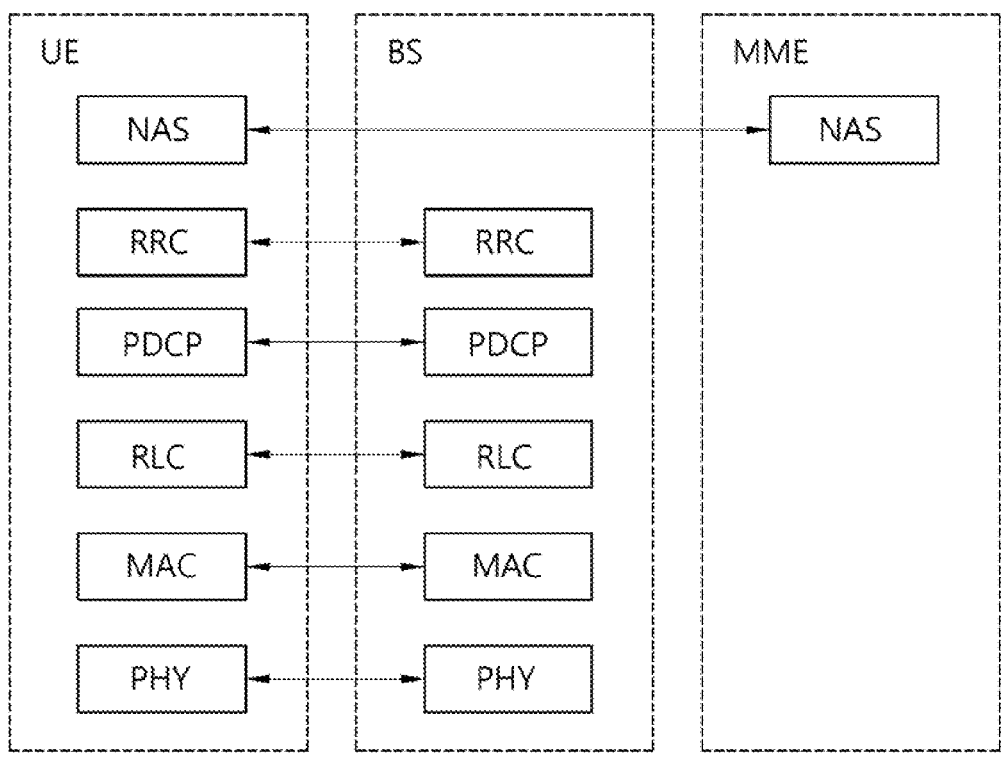
FIG. 3 is a block diagram illustrating a radio protocol architecture for a control plane.

FIG. 2 is a block diagram illustrating a radio protocol architecture for a user plane. FIG. 3 is a block diagram illustrating a radio protocol architecture for a control plane. The user plane is a protocol stack for user data transmission, and the control plane is a protocol stack for control signal transmission.

Referring to FIGS. 2 and 3, a physical (PHY) layer provides an information transfer service to an upper layer by using a physical channel. The PHY layer is connected with a medium access control (MAC) layer which is the upper layer through a transport channel. Data move between the MAC layer and the PHY layer through the transport channel. The transport channel is classified according to how the data is transmitted through a radio interface with any characteristic.

The data move between different PHY layers, that is, the PHY layers of the transmitter and the receiver through the physical channel. The physical channel may be modulated by an orthogonal frequency division multiplexing (OFDM) scheme, and use a time and a frequency as the radio resource.

A function of the MAC layer includes mapping between a logical channel and a transport channel and multiplexing/demultiplexing to a transport block provided to the physical channel on the transport channel of a MAC service data unit (SDU) which belongs to the logical channel. The MAC layer provides a service to a radio link control (RLC) layer through the logical channel.

A function of the RLC layer includes concatenation, segmentation, and reassembly of the RLC SDU. In order to secure various quality of services (QoS) required by a radio bearer (RB), an RLC layer provides three operation modes of a transparent mode (TM), an unacknowledged mode (UM), and an acknowledged mode (AM). The AM RLC provides an error correction through an automatic repeat request (ARQ).

The radio resource control (RRC) layer is defined only in the control plane. The RRC layer is related with configuration, re-configuration, and release of the RBs to serve to control the logical channel, the transport channel, and the physical channels. The RB means a logic path provided by a first layer (PHY layer) and a second layer (MAC layer, RLC layer, or PDCP layer) in order to transfer the data between the UE and the network.

A function of a packet data convergence protocol (PDCP) layer in the user plane includes transfer, header compression, and ciphering of the user data. A function of the PDCP layer in the control plane includes transfer and ciphering/integrity protection of control plane data.

The configuration of the RB means a process of defining characteristics of the radio protocol layer and the channel in order to provide a specific service and configuring each detailed parameter and operation method. The RB may be divided into a signaling RB (SRB) and a data RB (DRB) again. The SRB is used as a path for transmitting an RRC message in the control plane, and the DRB is used as a path for transporting user data in the user plane.

When RRC connection is established between the RRC layer of the UE and the RRC layer of the E-UTRAN, the UE is in an RRC connected state, and if not, the UE is in an RRC idle state.

A downlink transport channel for transporting the data to the UE from the network includes a broadcast channel (BCH) for transporting system information and a downlink shared channel (SCH) for transporting user traffic or a control message. The traffic or the control message of a downlink multicast or broadcast service may be transported through the downlink SCH, or may be transported through a separate downlink multicast channel (MCH). Meanwhile, an uplink transport channel for transporting the data from the UE to the network includes a random access channel (RACH) for transporting an initial control message and an uplink shared channel (SCH) for transporting the user traffic or the control message in addition to the RACH.

A logical channel which is above the transport channel and mapped in the transport channel includes a broadcast control channel (BCCH), a paging control channel (PCCH), a common control channel (CCCH), a multicast control channel (MCCH), a multicast traffic channel (MTCH), and the like.

The physical channel is constituted by several OFDM symbols in a time domain and several sub-carriers in a frequency domain. One sub-frame is constituted by a plurality of OFDM symbols in the time domain. The RB as a resource allocation unit is constituted by a plurality of OFDM symbols and a plurality of sub-carriers. Further, each sub-frame may use specific sub-carriers of specific OFDM symbols (for example, first OFDM symbols) of the corresponding sub-frame for the physical downlink control channel (PDCCH), that is, a L1/L2 control channel. A transmission time interval (TTI) is a unit time of sub-frame transmission.

Hereinafter, an RRC state of the UE and an RRC connection method will be described.

The RRC state means whether the RRC layer of the UE is logical-connected with the RRC layer of the E-UTRAN or not, and a case where the RRC layer of the UE is connected with the RRC layer of the E-UTRAN is called a RRC connection state, and a case where the RRC layer of the UE is not connected with the RRC layer of the E-UTRAN is called an RRC idle state. Since the RRC connection exists in the UE in the RRC connection state, the E-UTRAN may determine the existence of the corresponding UE in a cell unit, and as a result, the UE may be efficiently controlled. On the other hand, the UE in the RRC idle state may not be determined by the E-UTRAN, and a core network (CN) is managed by a tracking area unit which is a larger area unit than the cell. That is, in the UE in the RRC idle state, only the existence is determined by a large area unit, and the UE needs to move in the RRC connection state in order to receive a general mobile communication service such as voice or data.

When the user first turns on the power of the UE, the UE first searches a proper cell and then stays in the RRC idle state in the corresponding cell. The UE in the RRC idle state establishes the RRC connection with the E-UTRAN through an RRC connection procedure only when the RRC connection is required, and is transited into the RRC connection state. There are several cases where the UE in the RRC idle state requires the RRC connection, and for example, uplink data transmission is required due to reasons such as user's call attempt, or a response message to a case where a paging message is received from the E-UTRAN is transmitted.

A non-access stratum (NAS) layer positioned above the RRC layer performs functions such as a session management and a mobility management.

In the NAS layer, in order to manage mobility of the UE, two states of EDEPS mobility management-REGISTERED (EMM-REGISTER) and EMM-DEREGISTERED are defined, and the two states are applied to the UE and the MME. The initial UE is in the EMM-DEREGISTERED state, and the UE performs a procedure of registering the UE in the corresponding network through an initial attaching procedure so as to be connected to the network. When the attaching procedure is successfully performed, the UE and the MME are in the EMM-REGISTERED state.

In order to manage signaling connection between the UE and the EPS, two states of an EPS connection management (ECM)-IDLE state and an ECM-CONNECTED state, and the two states are applied to the UE and the MME. When the UE in the ECM-IDLE state is RRC-connected with the E-UTRAN, the corresponding UE becomes in the ECM-CONNECTED state. When the MME in the ECM-IDLE state is S1-connected with the E-UTRAN, the corresponding MME becomes in the ECM-CONNECTED state. When the UE is in the ECM-IDLE state, the E-UTRAN does not have context information of the UE. Accordingly, the UE in the ECM-IDLE state performs a procedure related with the mobility based on the UE such as cell selection or cell reselection without receiving a command of the network. On the contrary, when the UE is in the ECM-CONNECTED state, the mobility of the UE is managed by the command of the network. When a position of the UE in the ECM-IDLE state is different from a position which is known to the network, the UE notifies the corresponding position of the UE to the network through a tracking area updating procedure.

Next, the system information will be described.

The system information includes necessary information which the UE needs to known so as to be connected to the BS. Accordingly, the UE needs to receive all the system information before being connected to the BS, and further, needs to have latest system information at all times. In addition, since the system information is information to be known by all the UE in one cell, the BS periodically transmits the system information. System information is divided into a master information block (MIB) and a plurality of system information blocks (SIB).

The MIB may include a limited number of parameters required to be obtained for other information from a cell, which are most requisite and are most frequently transmitted. User equipment first finds the MIB after downlink synchronization. The MIB may include information including a downlink channel bandwidth, a PHICH configuration, an SFN that supports synchronization and operates as a timing reference, and an eNB transmission antenna configuration. The MIB may be broadcast-transmitted through a BCH.

System information block type 1 (SIB1) among the included SIBs is transmitted while being included in a message of "SystemInformationBlockType1" and SIBs other than the SIB1 is transmitted while being included in a system information message. Mapping the SIBs to the system information message may be flexibly configured by scheduling information list parameters included in the SIB1. However, each SIB may be included in a single system information message and only SIBs having the same scheduling requirement value (e.g., cycle) may be mapped to the same system information message. Further, system information block type 2 (SIB2) is continuously mapped to a system information message corresponding to a first entry in a system information message list of a scheduling information list. A plurality of system information messages may be transmitted within the same cycle. The SIB1 and all information system information messages are transmitted through a DL-SCH.

In addition to the broadcast transmission, in the E-UTRAN, the SIB1 may be dedicatedly signaled while including a parameter similarly to a value set in the related art and in this case, the SIB1 may be transmitted while being included in an RRC connection reconfiguration message.

The SIB1 includes information associated with a user cell access and defines scheduling of other SIBs. The SIB1 may include PLMN identifiers of the network, a tracking area code (TAC) and a cell. ID, a cell barring status indicating whether the cell is a cell which may camp on, a lowest receiving level required in the cell, which is used as a cell reselection reference, and information associated with transmission time and cycle of other SIBs.

The SIB2 may include radio resource configuration information common to all terminals. The SIB2 may include information associated with an uplink carrier frequency and an uplink channel bandwidth, an RACH configuration, a paging configuration, an uplink power control configuration, a sounding reference signal configuration, and a PUCCH configuration and a PUSCH configuration supporting ACK/NACK transmission.

The terminal may apply acquisition and change sensing procedures of the system information only to a PCell. In an SCell, the E-UTRAN may provide all system information associated with an RRC connection status operation through dedicated signaling when the corresponding SCell is added. When the system information associated with the configured SCell is changed, the E-UTRAN may release and add the considered SCell later and the release and addition may be performed together with the single RRC connection reconfiguration message. The E-UTRAN may configure parameter values other than a value broadcasted in the considered SCell through the dedicated signaling.

The terminal needs to guarantee validity of specific type system information and the system information is referred to as required system information. The required system information may be defined as follows.

In the case where the terminal is in an RRC idle status: It needs to be guaranteed that the terminal has valid versions of the MIB and the SIB1 as well as the SIB2 to SIB8 and this may be followed by supporting a considered RAT.

In the case where the terminal is in an RRC connection status: It needs to be guaranteed that the terminal has the valid versions of the MIB, the SIB1, and the SIB2.

In general, the validity of the system information may be guaranteed within a maximum of 3 hours after the system information is acquired.

Generally, services provided to the UE by the network may be divided into three types to be described below. Further, the UE differently recognizes the cell type according to which service may be provided. First, the services types will be described below, and then the cell types will be described.

1) Limited service: The service provides an emergency call and an earthquake and tsunami warning system (ETWS), and may be provided in an acceptable cell.

2) Normal service: The service means a public use of a general use, and may be provided in a suitable or normal cell.

3) Operator service: The service means a service for a communication network operator, and the cell may be used by only the communication network operator and may not be used by a general user.

In relation to the service type provided by the cell, the cell types may be divided below.

1) Acceptable cell: A cell in which the UE may receive the limited service. The cell is a cell which is not barred and satisfies a cell selection reference of the UE in the corresponding UE.

2) Suitable cell: A cell in which the UE may receive the normal service. The cell satisfies a condition of the acceptable cell and simultaneously satisfies additional conditions. As the additional conditions, the cell needs to belong to a public land mobile network (PLMN) to which the corresponding UE may be connected and be a cell in which the performance of the tracking area updating procedure of the UE is not barred. When the corresponding cell is a CSG cell, the UE needs to be a cell to be connected to the corresponding cell as the CSG member.

3) Barred cell: The cell is a cell which broadcasts information on a cell barred through the system information.

4) Reserved cell: The cell is a cell which broadcasts information on a cell reserved through the system information.

Figure 4:
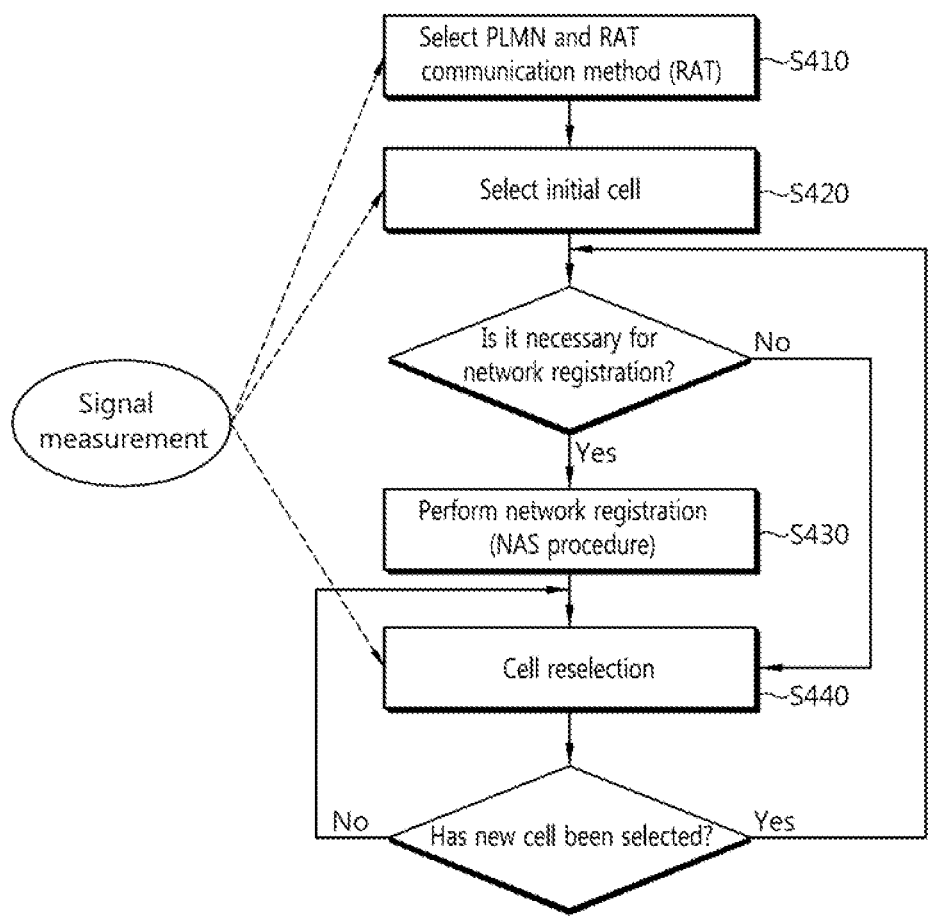
FIG. 4 is a flowchart illustrating an operation of the UE in the RRC idle state.

FIG. 4 is a flowchart illustrating an operation of the UE in the RRC idle state. FIG. 4 illustrates a procedure of registering a UE in which initial power is turned on in the network through a cell selection process and reselecting the cell if necessary.

Referring to FIG. 4, the UE selects a radio access technology (RAT) for communicating with the PLMN which is a network to receive the service (S410). Information on the PLMN and the RAT may be selected by the user of the UE, and stored in a universal subscriber identity module (USIM) to be used.

The UE selects the measuring BS and a cell having largest value among cells in which signal intensities and quality measured from the BS are larger than a predetermined value (Cell Selection) (S420). This is performing the cell selection by the turned-on UE and may be called initial cell selection. The cell selection procedure will be described below. After the cell selection, the UE receives system information which the BS periodically transmits. The aforementioned predetermined value means a value defined in the system for ensuring the quality for the physical signal in the data transmission/reception. Accordingly, the value may vary according to the applied RAT.

The UE performs a network registering procedure in the case where network registering is required (S430). The UE registers self-information (e.g., IMSI) in order to receive a service (e.g., paging) from the network. The UE needs not to be registered in the connected network whenever selecting the cell, but is registered in the network in the case where information (e.g., tracking area identity (TAI)) on the network received from the system information and information on a network which is known to the UE.

The UE performs cell reselection based on a service environment, a UE environment, or the like which is provide by the cell (S440). The UE selects one of other cells providing a better signal characteristic than the cell of the BS to which the UE is connected, when the value of the intensity or the quality of the signal measured from the BS receiving the service is a value measured from the BS of the neighbor cell. This process is distinguished from the initial cell selection of the second process to be called cell re-selection. In this case, in order to prevent the cell from being frequently reselected depending on the change in signal characteristic, there is a temporal constraint. The cell re-selection procedure will be described below.

Figure 5:
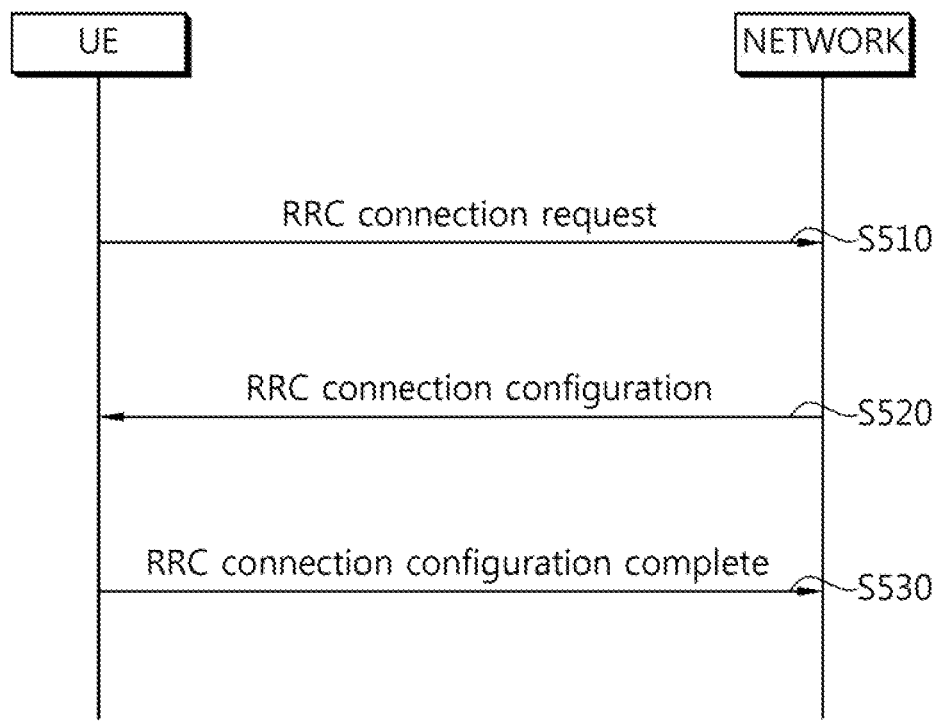
FIG. 5 is a flowchart illustrating a process of establishing RRC connection.

FIG. 5 is a flowchart illustrating a process of establishing RRC connection.

The UE transports an RRC connection request message requesting the RRC connection to the network (S510). The network transports an RRC connection setup message in a response for the RRC connection request (S520). After receiving the RRC connection setup message, the UE enters an RRC connection mode.

The UE transports to the network an RRC connection setup complete message used for verifying successful completion of the RRC connection establishment (S530).

Figure 6:
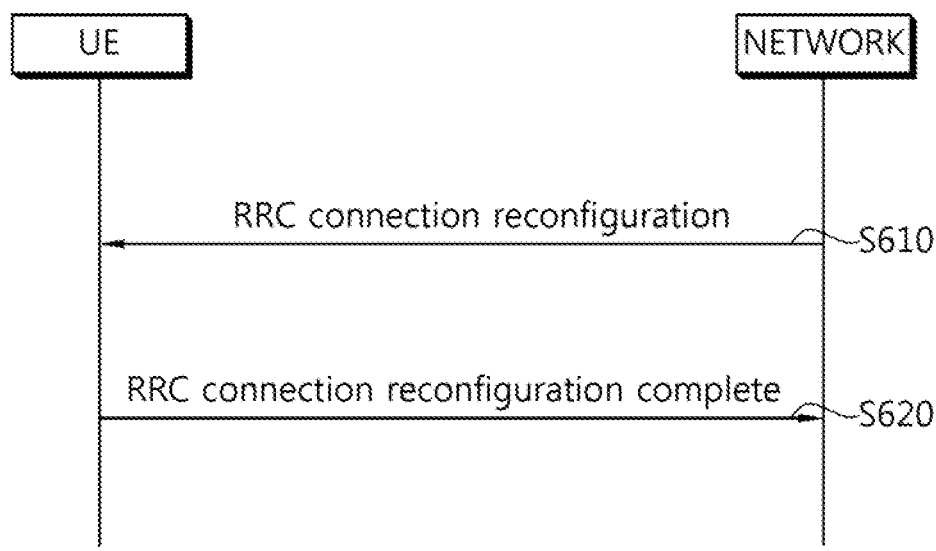
FIG. 6 is a flowchart illustrating an RRC connection reconfiguration process.

FIG. 6 is a flowchart illustrating an RRC connection reconfiguration process. The RRC connection reconfiguration is used for modifying the RRC connection. The RRC connection reconfiguration is used for RB establishment/modify/release, handover performance, and measurement setup/modify/release.

The network transports to the UE an RRC connection reconfiguration message for modifying the RRC connection (S610). The UE transports to the network an RRC connection reconfiguration complete message used for verifying successful completion of the RRC connection reconfiguration, as a response to the RRC connection reconfiguration (S620).

Hereinafter, the PLMN will be described.

The PLMN is a network which is arranged and operated by a mobile network operator. Each mobile network operator operates one or more PLMNs. Each PLMN may be identified as a mobile country code (MCC) and a mobile network code (MNC). PLMN information of the cell is included in the system information to be broadcasted.

In PLMN selection, cell selection, and cell re-selection, various types of PLMNs may be considered by the UE.

Home PLMN (HPLMN): PLMN having a MCC and a MNC matched with the MCC and the MNC of the UE IMSI.

Equivalent HPLMN (EHPLMN): PLMN handled to be equivalent to the HPLMN.

Registered PLMN (RPLMN): PLMN in which position registration is successfully completed.

Equivalent PLMN (EPLMN): PLMN handled to be equivalent to the RPLMN.

Each mobile service consumer is subscribed in the HPLMN. When a general service is provided to the UE by the HPLMN or the EHPLMN, the UE is not in a roaming state. On the other hand, when the service is provided to the UE by a PLMN other than the HPLMN/EHPLMN, the UE is in the roaming state, and the PLMN is called a visited PLMN (VPLMN).

The UE searches a usable PLMN and selects a suitable PLMN which may receive the service when the power is turned on in an initial stage. The PLMN is a network which is deployed or operated by a mobile network operator. Each mobile network operator operates one or more PLMNs. Each PLMN may be identified by a mobile country code (MCC) and a mobile network code (MNC). PLMN information of the cell is included in the system information to be broadcasted. The UE attempts to register the selected PLMN. When the registration is completed, the selected PLMN becomes a registered PLMN (RPLMN). The network may signal a PLMN list to the UE, and PLMNs included in the PLMN list may be considered as the PLMN such as the RPLMN. The UE registered in the network needs to be reachable by the network at all times. If the UE is in the ECM-CONNECTED state (equally, the RRC connection state), the network recognizes that the UE receives the service. However, when the UE is in the ECM-IDLE state (equally, the RRC idle state), the situation of the UE is not valid in the eNB, but stored in the MME. In this case, the position of the UE is in the ECM-IDLE state is notified to only the MME with granularity of the list of the tracking areas (TAs). A single TA is identified by a tracking area identity (TAI) constituted by a PLMN identity to which the TA belongs and a tracking area code (TAC) uniquely expressing the TA in the PLMN.

Next, among the cells provided by the selected PLMN, the UE selects a cell having signal quality and characteristic which may receive a suitable service.

Next, a procedure of selecting the cell by the UE will be described in detail.

When the power is turned on or the UE stays in the cell, the UE performs procedures for receiving the service by selecting/re-selecting a cell having proper quality.

The UE in the RRC idle state selects the cell having the proper quality at all times and needs to be prepared to receive the service through the selected cell. For example, the UE in which the power is just turned on needs to select the cell having the proper quality for registration to the network. When the UE in the RRC connection state enters the RRC idle state, the UE needs to select the cell staying in the RRC idle state. As such, a process of selecting the cell which satisfies any condition so that the UE stays in a service stand-by state such as the RRC idle state is called cell selection. Since the cell selection is performed in a state where the cell in which the UE stays in the RRC idle state is not currently determined, it is more important to select the cell as quickly as possible. Accordingly, so long as the cell is a cell providing radio signal quality of a predetermined level or more, even though the cell is not the cell providing the best signal quality to the UE, the cell may be selected in the cell selection process of the UE.

Hereinafter, with reference to 3GPP TS 36.304 V8.5.0 (2009-03) "User Equipment (UE) procedures in idle mode (Release 8)", a method and a procedure of selecting the cell by the UE in 3GPP LTE will be described in detail.

The cell selection process is largely divided to two processes.

First, as an initial cell selection process, the UE has no previous information on the radio channel in this process. Accordingly, the UE searches all radio channels in order to find a suitable cell. The UE finds the strongest cell in each channel. Thereafter, when the UE just finds the suitable cell stratifying a cell selection reference, the UE selects the corresponding cell.

Next, the UE may select the cell by using the stored information or using information broadcasted in the cell. Accordingly, the cell selection may be quickly performed as compared with the initial cell selection process. The UE selects the corresponding cell when just finding the cell satisfying the cell selection reference. If the UE does not find the suitable cell satisfying the cell selection reference through the process, the UE performs the initial cell selection process.

The criterion for the cell selection may be defined such as below equation 1.

$$Srxlev>0 \text{ AND } Squal>0 \quad \text{[Equation 1]}$$

where:

$Srxlev=Q_{rxlevmeas}-(Q_{rxlevmin}+W_{rxlevminoffset})-Pcompensation$ $Squal=Q_{qualmeas}-(Q_{qualmin}+Q_{qualminoffset})$ Herein, each variable of Equation 1 above may be defined by Table 1 below.

TABLE 1

| | |
|---|---|
| Srxlev | Cell selection RX level value (dB) |
| Squal | Cell selection quality value (dB) |
| $Q_{rxlevmeas}$ | Measured cell RX level value (RSRP) |
| $Q_{qualmeas}$ | Measured cell quality value (RSRQ) |
| $Q_{rxlevmin}$ | Minimum required RX level in the cell (dBm) |
| $Q_{qualmin}$ | Minimum required quality level in the cell (dB) |
| $Q_{rxlevminoffset}$ | Offset to the signalled $Q_{rxlevmin}$ taken into account in the Srxlev evaluation as a result of a periodic search for a higher priority PLMN while camped normally in a VPLMN [5] |
| $Q_{qualminoffset}$ | Offset to the signalled $Q_{qualmin}$ taken into account in the Squal evaluation as a result of a periodic search for a higher priority PLMN while camped normally in a VPLMN [5] |
| Pcompensation | $\max(P_{EMAX} - P_{PowerClass}, 0)$ (dB) |
| $P_{EMAX}$ | Maximum TX power level an UE may use when transmitting on the uplink in the cell (dBm) defined as $P_{EMAX}$ in [TS 36.101] |
| $P_{PowerClass}$ | Maximum RF output power of the UE (dBm) according to the UE power class as defined in [TS 36.101] |

Signalled values, i.e., $Q_{rxlevminoffset}$ and $Q_{qualminoffset}$, may be applied to a case where cell selection is evaluated as a result of periodic search for a higher priority PLMN during a UE camps on a normal cell in a VPLMN. During the periodic search for the higher priority PLMN as described above, the UE may perform the cell selection evaluation by using parameter values stored in other cells of the higher priority PLMN.

After the UE selects any cell through the cell selection process, the intensity or the quality of the signal between the UE and the BS may be changed according to mobility of the UE, a change in radio environment, or the like. Accordingly, when the quality of the selected cell deteriorates, the UE may select another cell providing better quality. As such, in the case of selecting the cell again, generally, the UE selects the cell providing better signal quality than the currently selected cell. This process is called cell reselection. The cell reselection process generally has a primary object to select a cell providing the best quality to the UE in terms of the quality of the radio signal.

In addition to the quality of the radio signal, the network determines a priority for each frequency to notify the determined priority to the UE. In the UE receiving the priority, the priority is first considered as compared the radio signal quality reference in the cell reselection process.

As such, there is the method of selecting or reselecting the cell according to a signal characteristic in the radio environment, and in the case of selecting the cell for reselection during the cell reselection, there may be methods of reselecting the cell according to a RAT of the cell and a frequency characteristic below.

Intra-frequency cell reselection: The UE reselects a cell having the same RAT and the same center-frequency as the cell during camping.

Inter-frequency cell reselection: The UE reselects a cell having the same RAT as and a different center-frequency from the cell during camping.

Inter-RAT cell reselection: The UE reselects a cell using a different RAT from the RAT during camping.

A principle of the cell reselection process is as follows.

First, the UE measures the quality of the serving cell and the quality of the neighbor cell for the cell reselection.

Second, the cell reselection is performed based on a cell reselection reference. The cell reselection reference has the following characteristics in association with the measurement of the serving cell and the neighbor cell.

The intra-frequency cell reselection is basically based on ranking. The ranking is an operation of defining index values for evaluating the cell reselection and ranking cells in an order of sizes of the index values by using the index values. A cell having the best index value is commonly called a best ranked cell. The cell index value is based on a value measured by the UE with respect to the corresponding cell and is a value applying a frequency offset or a cell offset if necessary.

The inter-frequency cell reselection is based on a frequency priority provided by the network. The UE attempts to camp on in a frequency having the highest frequency priority. The network may provide a frequency priority to be commonly applied to the UEs in the cell through the broadcast signaling or provide a priority for each frequency for every UE through dedicated signal for each UE. The cell reselection priority provided through the broadcast signaling may be referred to as a common priority, and the cell reselection priority set by the network for each UE may be referred to as a dedicated priority. When the UE receives the dedicated priority, the UE may receive a validity time related with the dedicated priority together. When the UE receives the dedicated priority, the UE starts a validity timer set as the validity time received together. The UE applies the dedicated priority in the RRC idle mode while the validity timer operates. When the validity timer ends, the UE discards the dedicated priority and applies the common priority again.

For the inter-frequency cell reselection, the network may provide parameters (for example, a frequency-specific offset) used in the cell reselection to the UE for each frequency.

For the intra-frequency cell reselection or the inter-frequency cell reselection, the network may provide a neighbor cell list (NCL) used in the cell reselection to the UE. The NCL includes cell-specific parameters (for example, a cell-specific offset) used in the cell reselection.

For the intra-frequency cell reselection or the inter-frequency cell reselection, the network may provide a cell reselection black list used in the cell reselection to the UE. The UE does not perform the cell reselection with respect to the cell included in the black list.

Next, the ranking performed in the cell reselection evaluating process will be described.

A ranking criterion used to give the priority of the cell is defined by Equation 1.

$$R_S=Q_{meas,s}+Q_{hyst}, R_n=Q_{meas,n}-Q_{offset} \quad \text{[Equation 1]}$$

Here, $R_S$ represents a ranking criterion of the serving cell, $R_n$ represents a ranking criterion of the neighbor cell, $Q_{meas,s}$ represents a quality value measured with respect to the serving cell by the UE, $Q_{meas,n}$ represents a quality value measured with respect to the neighbor cell by the UE, $Q_{hyst}$ represents a hysteresis value for ranking, and $Q_{offset}$ represents an offset between the both cells.

In the intra-frequency, when the UE receives the offset $Q_{offsets,n}$ between the serving cell and the neighbor cell, $Q_{offset}=Q_{offsets,n}$, and when the UE does not receive $Q_{offsets,n}$, $Q_{offset}=0$.

In the inter-frequency, when the UE receives the offset $Q_{offsets,n}$ for the corresponding cell, $Q_{offset}=Q_{offsets,n}+Q_{frequency}$, and when the UE does not receive $Q_{offsets,n}$, $Q_{offset}=Q_{frequency}$.

When the ranking criterion $R_S$ of the serving cell and the ranking criterion $R_n$ of the neighbor cell are changed in a similar state, the ranking order is frequently reversed as the changing result, and as a result, the UE may alternately reselect the two cells. $Q_{hyst}$ is a parameter for preventing the UE from alternately reselecting the two cells by giving the hysteresis in the cell reselection.

The UE measures the $R_S$ of the serving cell and the $R_n$ of the neighbor cell according to the Equation 1, regards the cell having the largest ranking criterion value as the best ranked cell, and selects the cell.

According to the reference, it can be seen that the quality of the cell acts as the most important reference in the cell reselection. When the reselected cell is not the suitable cell, the UE excludes the corresponding frequency or the corresponding cell from the cell reselection target.

When the UE performs the cell reselection according to the cell reselection evaluation, if the cell reselection criterion is satisfied during a specific time period, the UE may determine that the cell reselection criterion is satisfied and may perform cell movement to a target cell. Herein, the specific time may be given from a network as a parameter Treselection. Treselection may specify a cell reselection timer value, and may be defined for each frequency of E-UTRAN and for a different RAT.

Hereinafter, cell reselection information used for cell reselection of a UE will be described.

The cell reselection information may be transmitted by being included in system information which is broadcast from a network in a form of a cell reselection parameter, and may be provided to the UE. The cell reselection parameter provided to the UE may have the following types.

cellReselectionPriority: The parameter cellReselectionPriority specifies a priority for a group of E-UTRAN frequencies, UTRAN frequencies, and GERAN frequencies, a band class of CDMA2000 HRPD, or a band class of CDMA2000 1xRTT.

$Qoffset_{s,n}$: This parameter specifies an offset value between two cells.

$Qoffset_{frequency}$: This parameter specifies a frequency specific offset for a same-priority E-UTRAN frequency.

$Q_{hyst}$: This parameter specifies a hysteresis value for a rank index.

$Q_{qualmin}$: This parameter specifies a minimum required quality level and is specified in unit of dB.

$Q_{rxlevmin}$: This parameter specifies a minimum required Rx level and is specified in unit of dB.

$Treselection_{EUTRA}$: This parameter specifies a cell reselection timer value for E-UTRAN, and may be configured for each frequency of E-UTRAN.

$Treselection_{UTRAN}$: This parameter specifies a cell reselection timer value for UTRAN.

$Treselection_{GERA}$: This parameter specifies a cell reselection timer value for GERAN.

$Treselection_{CDMA\_HRPD}$: This parameter specifies a cell reselection timer value for CDMA HRPD.

$Treselection_{CDMA\_1xRTT}$: This parameter specifies a cell reselection timer value for CDMA 1xRTT.

$Thresh_{x,HighP}$: This parameter specifies a threshold Srxlev in unit of dB. Herein, the threshold is used by the UE when cell reselection is performed using an RAT/frequency having a higher priority than a serving frequency. A specific threshold may be set individually for each frequency of E-UTRAN and UTRAN, each group of GERAN frequencies, each band class of CDMA2000 HRPD, and each band class of CDMA2000 1xRTT.

$Thresh_{x,HIGHQ}$: This parameter specifies a threshold Squal in unit of dB. Herein, the threshold is used by the UE when cell reselection is performed using an RAT/frequency having a higher priority than a serving frequency. A specific threshold may be set individually for each frequency of E-UTRAN and UTRAN FDD.

$Thresh_{x,LowP}$: This parameter specifies a threshold Srxlev in unit of dB. Herein, the threshold is used by the UE when cell reselection is performed using an RAT/frequency having a lower priority than a serving frequency. A specific threshold may be set individually for each frequency of E-UTRAN and UTRAN, each group of GERAN frequencies, each band class of CDMA2000 HRPD, and each band class of CDMA2000 1xRTT.

$Thresh_{x,LowQ}$: This parameter specifies a threshold Squal in unit of dB. Herein, the threshold is used by the UE when cell reselection is performed using an RAT/frequency having a lower priority than a serving frequency. A specific threshold may be set individually for each frequency of E-UTRAN and UTRAN FDD.

$Thresh_{Serving,LowP}$: This parameter specifies a threshold Srxlev in unit of dB. Herein, the threshold is used by the UE when cell reselection is performed using a lower RAT/frequency.

$Thresh_{Serving,LowQ}$: This parameter specifies a threshold Squal in unit of dB. Herein, the threshold is used by the UE when cell reselection is performed using a lower RAT/frequency.

$S_{IntraSerachP}$: This parameter specifies a threshold Srxlev for intra-frequency measurement in unit of dB.

$S_{IntraSerachQ}$: This parameter specifies a threshold Squal for intra-frequency measurement in unit of dB.

$S_{nonIntraSerachP}$: This parameter specifies a threshold Srxlev for E-UTRAN inter-frequency and inter-RAT measurement unit of dB.

$S_{nonIntraSerachQ}$: This parameter specifies a threshold Squal for E-UTRAN inter-frequency and inter-RAT measurement in unit of dB.

Meanwhile, the aforementioned cell reselection parameter may be scaled according to a UE mobility. The UE mobility may be estimated on the basis of the number of times of performing movement of the UE through the cell reselection and/or a handover during a specific time duration, and this is called mobility state estimation (MSE). According to the MSE, the UE mobility may be estimated as one of a normal mobility state, a medium mobility state, and a high mobility state.

In the MSE, a parameter that can be used as a criterion for mobility state estimation may be provided. $T_{CRmax}$ specifies a specific time duration for counting the number of times of performing movement of a different UE in the MSE. $N_{CR\_H}$ indicates the maximum number of times of performing cell reselection for entering the high mobility. $N_{CR\_M}$ indicates the maximum number of times of performing cell reselection for entering the medium mobility. $T_{CRmaxHyst}$ indicates an extra time duration before the UE enters the normal mobility state.

The UE in the RRC_IDLE state performs cell reselection when a cell reselection condition is satisfied. If the number of times of performing the cell reselection by the UE exceeds a first threshold $N_{CR\_H}$ during $T_{CRmax}$, a mobility state of the UE satisfies a condition of the high mobility state. Meanwhile, if the number of times of performing the cell reselection exceeds a second threshold $N_{CR\_M}$ and does not exceed the first threshold $N_{CR\_H}$, the mobility state of the UE satisfies a condition of the medium mobility state. If the number of times of performing the cell reselection by the UE exceeds the second threshold $N_{CR\_M}$ during $T_{CRmax}$, the mobility state of the UE satisfies a condition of the normal mobility state. For example, if the UE is not detected as the high mobility state and the normal mobility state during an extra time duration $T_{CRmaxHyst}$, the UE may be estimated as the normal mobility state. However, if the UE performs the cell reselection continuously between two identical cells, it may not be counted as the number of performing the cell reselection.

A scaling factor may be specified according to the UE mobility state depending on the MSE. The scaling factor may be applied to one or more cell reselection parameters. For example, scaling factors sf-Medium and sf-High based on the medium mobility and the high mobility may be applied to Qhyst, $Treselection_{EUTRA}$, $Treselection_{UTRA}$, $Treselection_{GERA}$, $Treselection_{CDMA\_HRPD}$, and $Treselection_{CDMA\_1xRTT}$.

Hereinafter, a characteristic in which cell reselection information such as the aforementioned cell reselection parameters is provided through system information is described.

SIB3 (SystemInformationBlockType3) may include cell reselection information which is commonly applicable to intra-frequency cell reselection, inter-frequency cell reselection, and/or inter-RAT cell reselection. Examples of the cell reselection parameter provided to a UE through the SIB3 may include Qhyst, sf-High, sf-Medium, $Q_{qualmin}$, $Q_{rxlevmin}$, $S_{IntraSearchP}$, $S_{IntraSearchQ}$, $S_{nonIntraSearchP}$, $S_{nonIntraSearchQ}$, $Thresh_{Serving,LowP}$, $Thresh_{Serving,LowQ}$, $Treselection_{EUTRA}$, etc.

SIB4 (SystemInformationBlockType4) may include cell reselection information related to a neighboring cell as information for intra-frequency cell reselection. For example, the SIB4 may include list information of intra-frequency neighboring cells registered to a blacklist and information on a list of intra-frequency neighboring cells having specific cell reselection parameters. Further, the SIB4 may include $Q_{offsets,n}$.

SIB5 (SystemInformationBlockType5) may include inter-frequency cell reselection. The SIB5 may include cell reselection parameters commonly applicable to a specific frequency, and specific cell reselection parameters. For example, the SIB5 may be applied to list information of intra-frequency neighboring cells registered to a blacklist and information on a list of intra-frequency neighboring cells having specific cell reselection parameters, list information of neighboring inter-frequencies, a scaling factor applicable to $Qoffset_{s,n}$, $Qoffset_{frequency}$, $Q_{qualmin}$, $Thresh_{X,HighP}$, $Thresh_{X,HighQ}$, $Thresh_{X,LowP}$, $Thresh_{X,LowQ}$, $Treselection_{EUTRA}$, and $Treselection_{EUTRA}$, etc.

SIB6 (SystemInformationBlockType6) may include information for inter-RAT cell reselection. That is, the SIB6 may include information regarding a UTRA neighboring cell suitable for cell reselection. The SIB6 may include cell reselection parameter commonly applicable to a specific frequency. For example, the SIB6 may include carrier frequency list information of UTRA FDD, a scaling factor applicable to $Q_{qualmin}$, $Q_{rxlevmin}$, $Treselection_{UTRA}$, and $Treselection_{UTRA}$, and may include $Thresh_{X,HighP}$, $Thresh_{X,HighQ}$, $Thresh_{X,LowP}$, $Thresh_{X,LowQ}$, etc.

SIB7 (SystemInformationBlockType7) may include information for inter-RAT cell reselection. That is, the SIB7 may include information on a GERAN frequency. For example, the SIB7 may include GERAN carrier frequency list information in one group of GERAN carrier frequencies, neighboring GERAN carrier frequency list information, a scaling factor applicable to $Q_{qualmin}$, $Q_{rxlevmin}$, $Thresh_{X,HighP}$, $Thresh_{X,LowP}$, $Treselection_{GERAN}$, and $Treselection_{GERAN}$, etc.

SIB8 (SystemInformationBlockType8) may include information for inter-RAT cell reselection. That is, the SIB8 may include information on a CDMA2000 frequency and information on CDMA2000 neighboring cell suitable for cell reselection. The SIB8 may include cell reselection parameters commonly applicable to a specific frequency, and specific cell reselection parameters. For example, the SIB8 may include CDMA neighboring cell list information, information on a CDMA2000 frequency list and neighboring cell list for each frequency, a scaling factor applicable to $Thresh_{X,HighP}$, $Thresh_{X,LowP}$, $Treselection_{CDMA\_HRPG}$, and $Treselection_{CDMA\_HRPD}$, etc.

Meanwhile, the cell reselection information may be provided to the UE by being included in an RRC connection release message which is an RRC message transmitted for releasing an RRC connection between the network and the UE. For example, the RRC connection release message may include a subcarrier frequency list and cell reselection priority of E-UTRAN, a subcarrier frequency list and cell reselection priority of UTRA-FDD, a subcarrier frequency list and cell reselection priority of UTRA-TDD, a subcarrier frequency list and cell reselection priority of GERAN, a band class list and cell reselection priority of CDMA2000 HRPD, a band class list and cell reselection priority of CDMA2000 1xRTT, etc.

Hereinafter, RAN sharing by a plurality of operators will be described.

The plurality of operators may provide a service by individually implementing an RAN, and may provide a service to a subscriber by sharing a cell implemented by a specific operator. This is called RAN sharing. In this case, a cell shared by the plurality of operators may broadcast a PLMN list. The PLMN list may be transmitted by being included in SIB1 of system information which is broadcast by the cell. Meanwhile, it may be implemented such that a PLMN identifier which is first enumerated in the PLMN list included in the SIB1 indicates a primary PLMN.

In a situation where one cell is shared by the plurality of operators, cell reselection information provided by the shared cell may be commonly applied to all PLMNs in the PLMN list. In general, the cell reselection information provided by the shared cell is configured to primarily conform to a policy of the primary PLMN. Therefore, UEs to which a service based on a secondary PLMN is provided performs cell reselection based on information other than cell reselection information optimized to provide a service.

Figure 7:
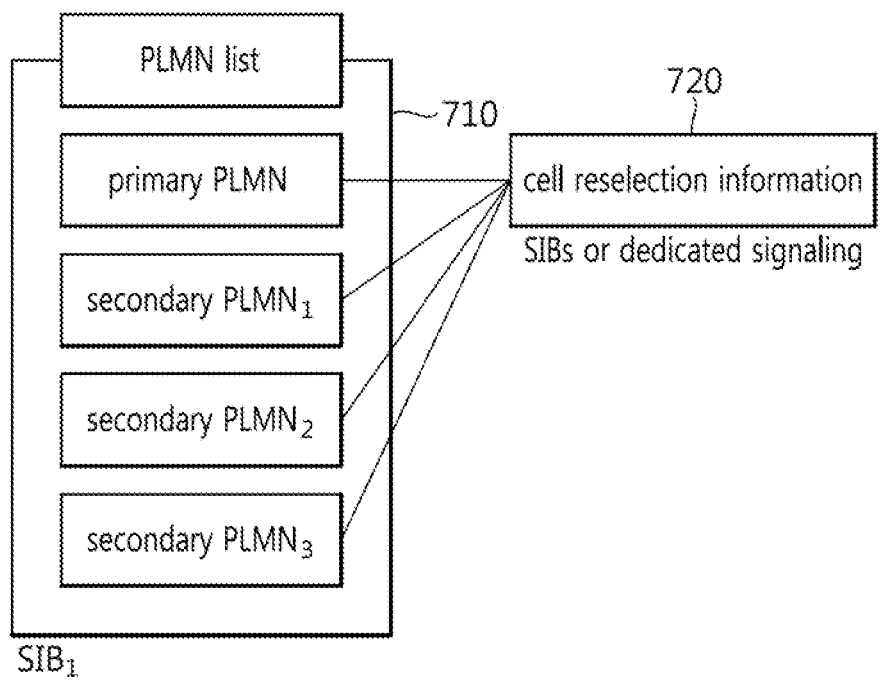
FIG. 7 shows an example of configuring cell reselection information in a communication system in which cells are shared.

FIG. 7 shows an example of configuring cell reselection information in a communication system in which cells are shared.

Referring to FIG. 7, a PLMN list 710 is included in SIB1 of system information which is broadcast by a cell, and identifiers of a primary PLMN, a secondary PLMN$_1$, a secondary PLMN$_2$, and a secondary PLMN$_3$ are included in the PLMN list 710. Therefore, it can be seen that the cell is shared by four PLMN-based operators.

The cell reselection information 720 is provided through the SIBs of the system information or through dedicated signaling such as an RRC connection release message. For example, the cell reselection information may include frequency priority related information for cell reselection. The frequency priority related information may be configured as information suitable for the primary PLMN of the cell. Therefore, if a UE which uses the primary cell as a registered PLMN (rPLMN) selects the cell through the cell reselection information, there is a high possibility that the selected target cell is a cell capable of providing an effective service to the UE.

Meanwhile, as to the UE which uses the secondary PLMN as the rPLMN, the cell reselection information may not information suitable for cell reselection of the UE. Nevertheless, the UE may perform the cell reselection by using the provided cell reselection information, and thus the selected target cell may not be able to provide an effective service to the UE. Further, there is a possibility that the UE must perform additional movement to receive a service.

There is a need to provide a cell reselection method capable of preventing a phenomenon in which cell reselection is not properly achieved when inappropriate cell reselection information is provided to a UE in an environment where a cell is shared by a plurality of operators.

The present invention provides a method of providing a plurality of cell reselection information sets applicable to a primary PLMN and at least one secondary PLMN by the cell shared by the plurality of operators.

Figure 8:
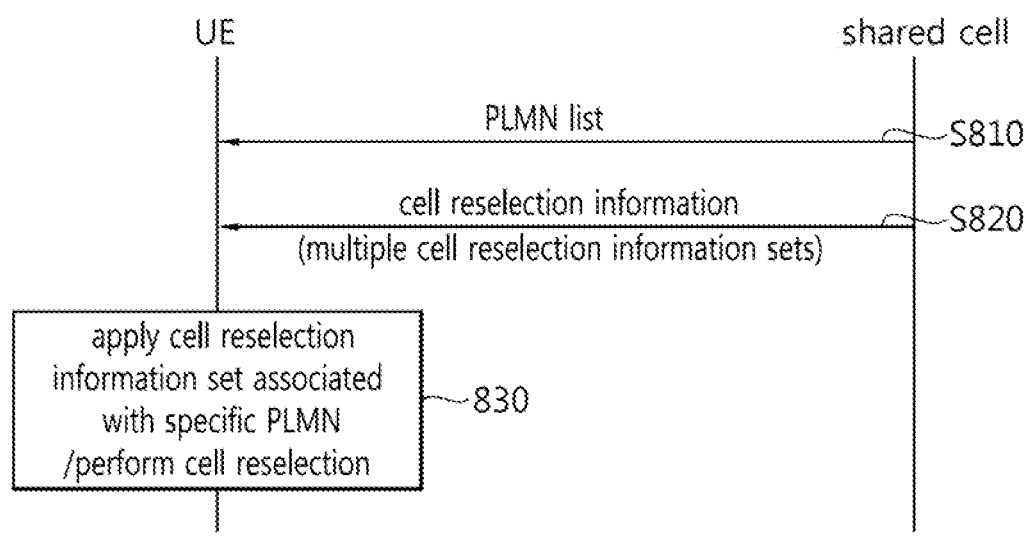
FIG. 8 shows a cell reelection method according to an embodiment of the present invention.

FIG. 8 shows a cell reelection method according to an embodiment of the present invention.

Referring to FIG. 8, a shared cell transmits a PLMN list to a UE (step S810). The PLMN list may include identifiers of one primary PLMN related to a plurality of operators sharing the cell and at least one secondary PLMN. The PLMN list may be transmitted by being included in SIB1 of system information.

The shared cell provides cell reelection information to the UE (step S820). The cell reselection information may be transmitted by being included in SIBs of the system information, or may be transmitted through dedicated signaling such as transmission of an RRC connection release message.

The cell reselection information may include a plurality of cell reselection information sets applicable to the primary PLMN and at least one secondary PLMN. Each cell reselection information set may include the aforementioned cell reselection parameters.

The plurality of cell reselection information sets may be implemented in various types. Hereinafter, a method of implementing a cell reselection information set in cell reselection information is described in greater detail by referring to the accompanying drawings.

Figure 9:
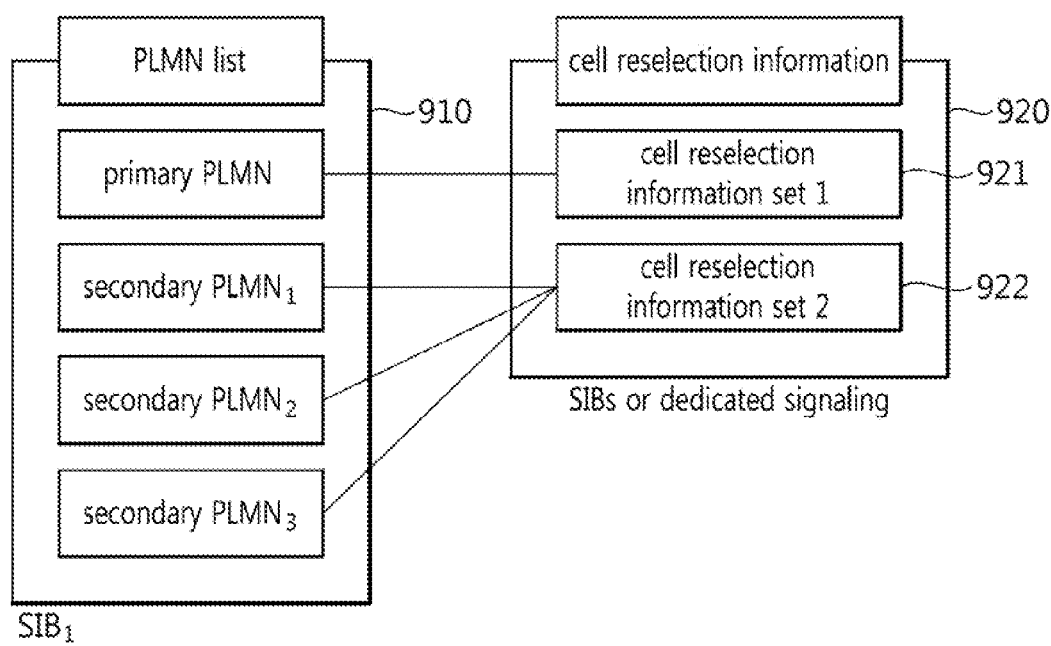
FIG. 9 shows an example of implementing cell reselection information according to an embodiment of the present invention.

FIG. 9 shows an example of implementing cell reselection information according to an embodiment of the present invention.

Referring to FIG. 9, a PLMN list 910 is included in SIB1 of system information which is broadcast by a cell, and identifiers of a primary PLMN, a secondary PLMN$_1$, a secondary PLMN$_2$, and a secondary PLMN$_3$ are included in the PLMN list 910. Therefore, it can be seen that the cell is shared by four PLMN-based operators.

Cell reselection information 920 may be provided through SIBs of the system information or through dedicated signaling such as an RRC connection release message. The cell reselection information 920 may include a cell reselection information set #1 921 and a cell reselection information set #2 922. The cell reselection information set #1 921 is information associated with the primary PLMN and may be configured as information that can be used for cell reselection by a UE which uses the primary cell as an rPLMN. The cell reselection information set #2 922 is information associated with the secondary PLMNs and may be configured as information that can be used for cell reselection by a UE which uses one of the enumerated secondary PLMNs as the rPLMN. That is, the cell reselection information set #2 922 is cell reselection information commonly applicable for the secondary PLMNs.

Figure 10:
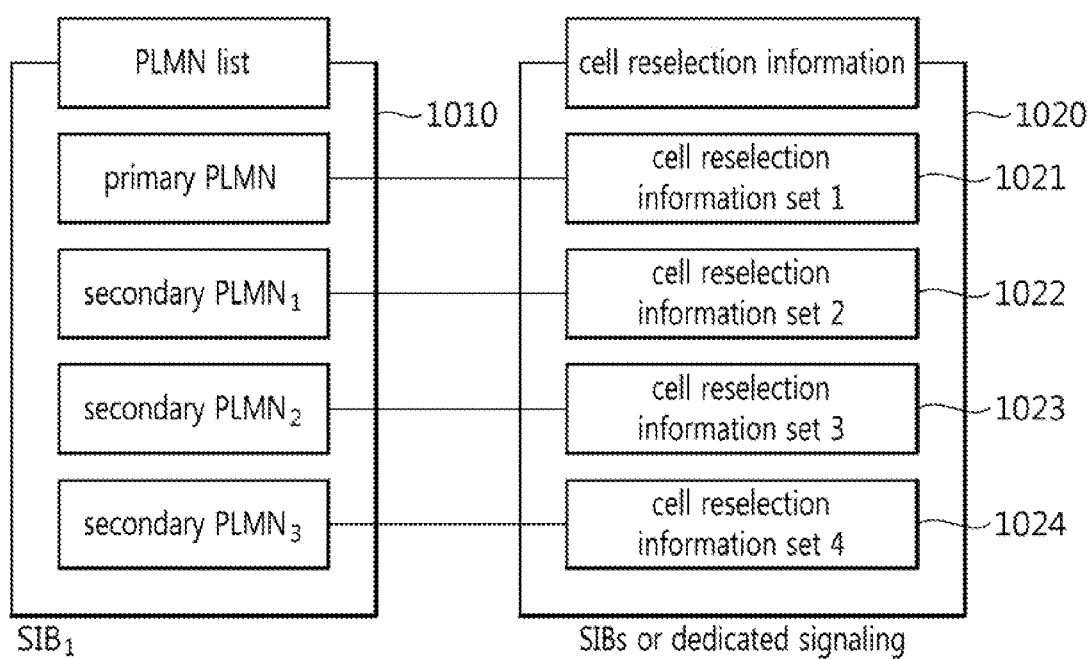
FIG. 10 shows another example of implementing cell reselection information according to an embodiment of the present invention.

FIG. 10 shows another example of implementing cell reselection information according to an embodiment of the present invention.

Referring to FIG. 10, a PLMN list 1010 is included in SIB1 of system information which is broadcast by a cell, and identifiers of a primary PLMN, a secondary PLMN$_1$, a secondary PLMN$_2$, and a secondary PLMN$_3$ are included in the PLMN list 1010. Therefore, it can be seen that the cell is shared by four PLMN-based operators.

Cell reselection information 1020 may be provided through SIBs of the system information or through dedicated signaling such as an RRC connection release message. The cell reselection information 1020 may include a cell reselection information set #1 1021, a cell reselection information set #2 1022, a cell reselection information set #3 1023, and a cell reselection information set #4 1024. Each cell reselection information set may be individually associated with each PLMN. The cell reselection information set #1 1021 may be applied when cell reselection is performed by a UE which uses the primary PLMN as an rPLMN. The cell reselection information set #2 1022 may be applied when cell reselection is performed by the UE which uses the secondary PLMN$_1$ as the rPLMN. The cell reselection information set #3 1023 may be applied when cell reselection is performed by the UE which uses the secondary PLMN$_2$ as the rPLMN. The cell reselection information set #4 1024 may be applied when cell reselection is performed by the UE which uses the secondary PLMN$_3$ as the rPLMN. As such, cell reselection information sets and the primary and secondary PLMNs may be one-to-one mapped.

Figure 11:
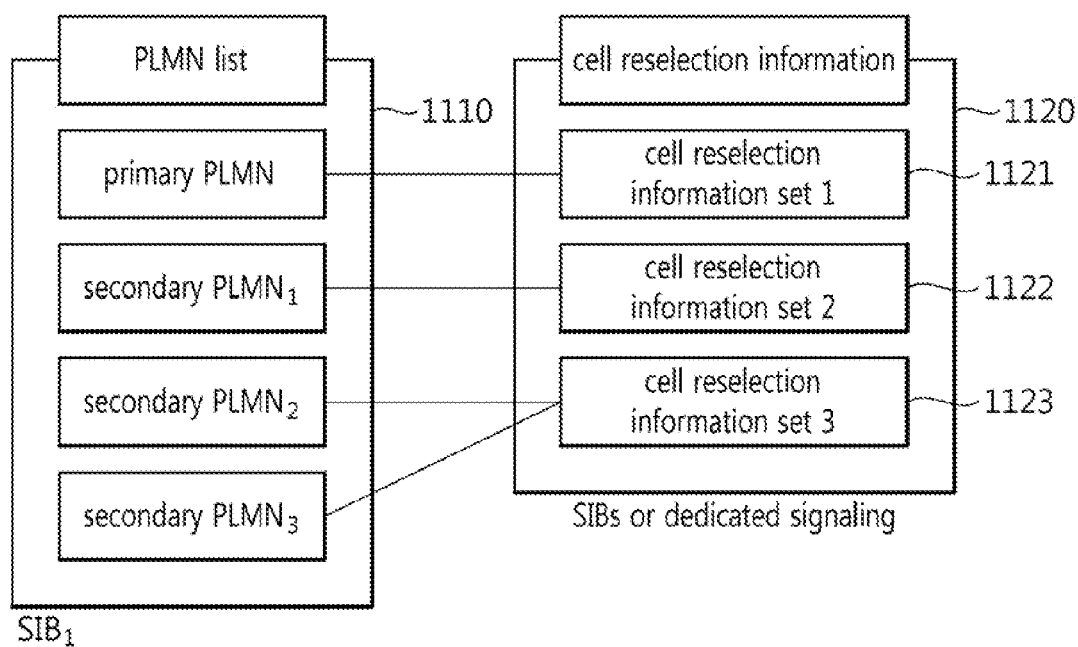
FIG. 11 shows another example of implementing cell reselection information according to an embodiment of the present invention.

FIG. 11 shows another example of implementing cell reselection information according to an embodiment of the present invention.

Referring to FIG. 11, a PLMN list 1110 is included in SIB1 of system information which is broadcast by a cell, and identifiers of a primary PLMN, a secondary PLMN$_1$, a secondary PLMN$_2$, and a secondary PLMN$_3$ are included in the PLMN list 1110. Therefore, it can be seen that the cell is shared by four PLMN-based operators.

Cell reselection information 1120 may be provided through SIBs of the system information or through dedicated signaling such as an RRC connection release message. The cell reselection information 1120 may include a cell reselection information set #1 1121, a cell reselection information set #2 1122, and a cell reselection information set #3 1123.

The primary PLMN may be associated with the first enumerated cell reselection information set #1 1121. Meanwhile, at least one secondary PLMN may be associated with a specific cell reselection information set in a one-to-one manner, or a plurality of secondary PLMNs may be associated with one cell reselection information set. Referring to the figure, the secondary PLMN$_1$ is associated with the cell reselection information set #2 1122, and the secondary PLMN$_2$ and the secondary PLMN$_3$ are associated with the cell reselection information set #3 1123.

The cell reselection information set #1 1121 may be applied when a UE which uses the primary PLMN as an rPLMN performs cell reselection. The cell reselection information set #2 1121 may be applied when a UE which uses the secondary PLMN$_1$ as the rPLMN performs cell reselection. The cell reselection information set #3 1123 may be applied when a UE which uses the secondary PLMN$_2$ or the secondary PLMN$_3$ as the rPLMN performs cell reselection.

If the cell reselection information of FIG. 9 is provided, the UE may not require additional signaling to indicate which secondary PLMN and which cell reselection information set are associated. Upon receiving the cell reselection information, the UE may determine that the primary PLMN in the list is associated with a first enumerated cell reselection information set, and secondary PLMNs in the list are associated with the remaining one cell reselection information set.

Unlike FIG. 9, if the cell reselection information implemented as shown in FIG. 10 and FIG. 11 is provided to the UE, it may be required for the UE to define an implicit criterion regarding which PLMN and which cell reselection information set are associated or to provide additional signaling.

If the cell reselection information implemented as shown in FIG. 10 is provided, an implicit criterion regarding an association between the PLMN and the cell reselection information set may be defined.

Figure 12:
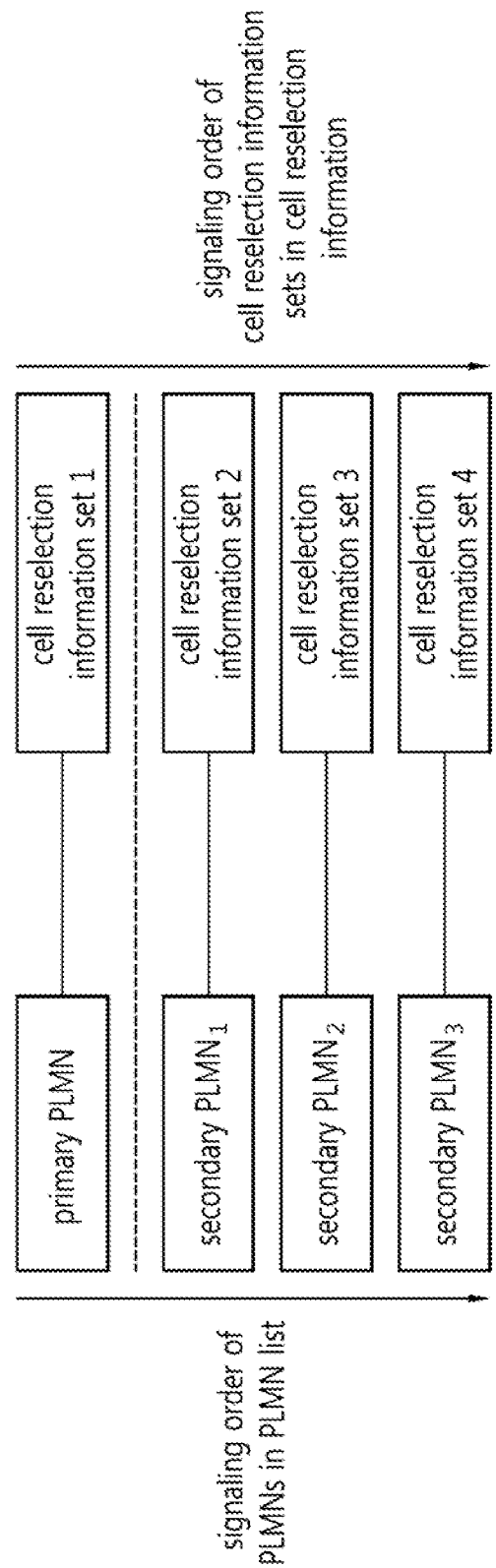
FIG. 12 shows an example of a cell reselection information association according to an embodiment of the present invention.

FIG. 12 shows an example of a cell reselection information association according to an embodiment of the present invention.

Referring to FIG. 12, PLMNs indicated by a PLMN list and a cell reselection information set included in cell reselection information are one-to-one mapped. In this case, a UE may determine that a specific PLMN and a cell reselection information set are associated according to a signaling order (i.e., enumerated order) of PLMNs in the PLMN list and according to a signaling order of cell reselection information sets in the cell reselection information. Meanwhile, the UE may determine that a primary PLMN is associated with first cell reselection information.

Unlike the example of FIG. 12, the UE may be provided with explicit signaling regarding which PLMN and which cell reselection information set are associated.

Figure 13:
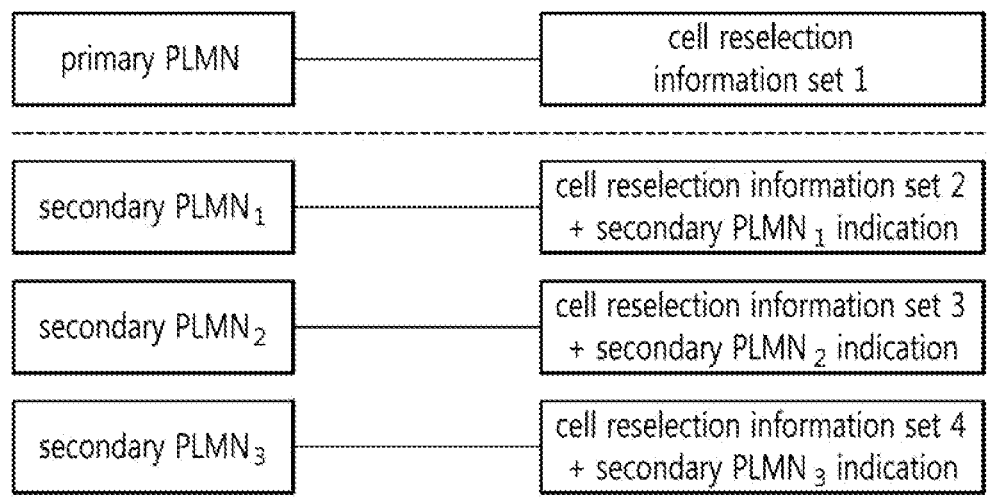
FIG. 13 shows another example of a cell reselection information association according to an embodiment of the present invention.

FIG. 13 shows another example of a cell reselection information association according to an embodiment of the present invention.

Referring to FIG. 13, PLMNs indicated by a PLMN list and a cell reselection information set included in cell reselection information are one-to-one mapped. A UE may determine that a primary PLMN is associated with a first enumerated cell reselection information set 1. The UE may use association information which is additionally signaled when determining an association between secondary PLMNs and the cell reselection information set. The UE may determine an association between a specific PLMN and the specific cell reselection information set through an indication of the secondary PLMN.

In FIG. 13, although the UE can obviously determine the cell reselection information set associated with the primary PLMN, it is also possible to provide signaling explicitly indicating the cell reselection information set associated with the primary PLMN.

Although a case where the PLMNs and the cell reselection information sets are one-to-one mapped is shown in FIG. 13, the present invention is not limited to the case where explicit signaling of association information is one-to-one mapped. Even if the plurality of PLMNs are associated with a specific cell reselection information set, the association information may also be implemented to indicate that the specific cell reselection information set is associated with two or more PLMNs.

Figure 14:
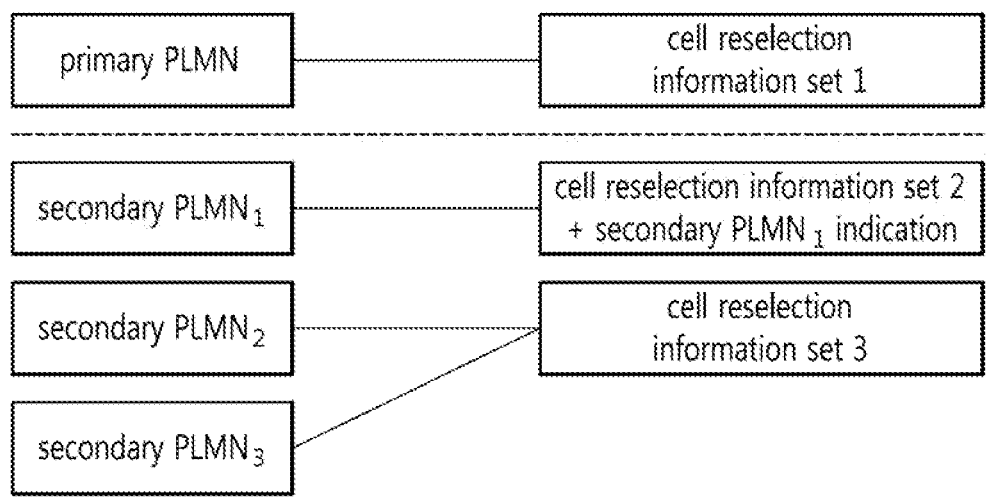
FIG. 14 shows another example of a cell reselection information association according to an embodiment of the present invention.

FIG. 14 shows another example of a cell reselection information association according to an embodiment of the present invention.

Referring to FIG. 14, in a situation where a PLMN list and cell reselection information are provided to a UE as shown in FIG. 11, association information is provided by being explicitly signaled. The UE may know that a primary PLMN is associated with a first enumerated cell reselection information set 1, and may know that a secondary PLMN$_1$ is associated with a cell reselection information set 2 through association information. Meanwhile, the association information may not indicate how a secondary PLMN$_2$ and a secondary PLMN$_3$ are associated with a cell reselection information set 3. Accordingly, the UE may determine that one or more remaining secondary PLMNs and remaining cell reselection information sets of which an association is not indicated by the association information are not associated. Therefore, the UE may determine that the secondary PLMN$_2$ and the secondary PLMN$_3$ are associated with the cell reselection information set 3.

Returning to FIG. 8, the UE may perform cell reselection by applying a cell reselection information set associated with a specific PLMN. The specific PLMN may be an rPLMN of the UE among the primary PLMN and at least one secondary PLMN included in the PLMN list.

If the UE camps on a cell shared through the primary PLMN, the UE may apply the cell reselection information set associated with the primary PLMN when performing cell reselection evaluation.

If the UE camps on a cell shared through the secondary PLMN, the UE may apply the cell reselection information set associated with the secondary PLMN when performing cell reselection evaluation. The UE may discover the cell reselection information set associated with the secondary PLMN through an implicit criterion and/or association information, and may apply this to perform cell reselection.

If the cell reselection information set for the secondary PLMNs is broadcast through system information in the embodiment of the present invention, it may be provided through an extended portion of specific cell reselection information implemented in the system information. For example, if cell reselection information associated with a specific secondary PLMN is information for intra-frequency cell reselection, this may be provided by being included in an extended portion of SIB4.

The aforementioned cell reselection information set may be defined for intra-frequency cell reselection. The aforementioned cell reselection information set may be defined for inter-frequency cell reselection. The aforementioned cell reselection information set may be defined for inter-RAF frequency cell reselection.

In the cell reselection method of the present invention, a technical feature of providing cell reselection information for a secondary PLMN is not limitedly applied only to the cell reselection method. The technical feature may also be applied to a typical case where information for operating a UE is provided in an environment where a specific cell is shared by a plurality of operators in a wireless communication system. For example, information for not only a primary PLMN but also at least one secondary PLMN may be provided during a procedure of cell selection is performed by the UE.

In the cell reselection method according to the embodiment of the present invention, cell reselection information optimized not to the primary PLMN but to the secondary PLMN may be additionally provided. The UE may perform cell reselection by selectively using cell reselection information associated with its rPLMN. In comparison with the existing cell reselection, the UE may move by selecting a cell capable of providing a more suitable service. In addition, it is possible to avoid a problem in that an additional cell movement procedure must be performed due to incorrect cell selection. Accordingly, a service can be more effectively provided to the UE, and service quality for the UE can be improved.

Figure 15:
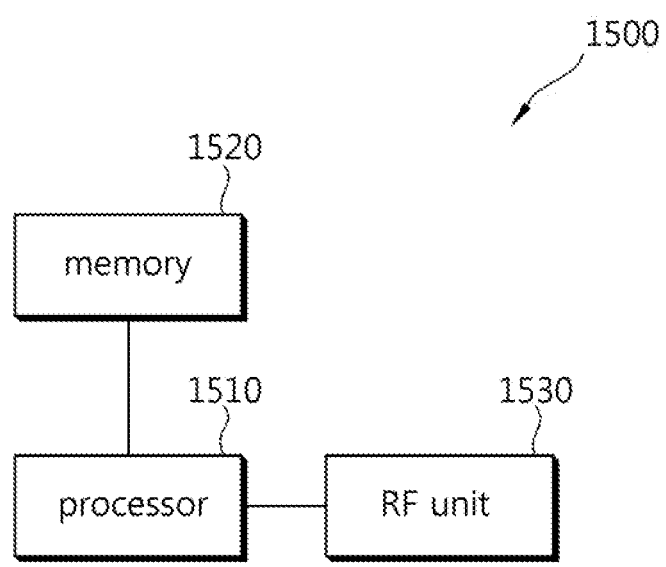
FIG. 15 is a block diagram showing a wireless device according to an embodiment of the present invention.

FIG. 15 is a block diagram showing a wireless device according to an embodiment of the present invention. This device may be implemented with a UE or network system for performing a cell selection method according to the embodiment of the present invention.

Referring to FIG. 15, a wireless device 1500 includes a processor 1510, a memory 1520, and a radio frequency (RF) unit 1530. The processor 1510 implements the proposed functions, procedures, and/or methods. The processor 1510 may be configured to acquire a PLMN list and cell reselection information and to perform cell reselection. The processor 1510 may be configured to perform the aforementioned embodiment of the present invention with reference to FIG. 8 to FIG. 14.

The RF unit 1530 may be coupled to the processor 1510 to transmit and receive a radio signal.

The processor may include an application-specific integrated circuit (ASIC), another chip set, a logic circuit and/or a data processing apparatus. The memory may include a read-only memory (ROM), a random access memory (RAM), a flash memory, a memory card, a storage medium, and/or other storage device. The RF unit may include a baseband circuit for processing the radio signal. When the exemplary embodiment is implemented by software, the aforementioned technique may be implemented by a module (a process, a function, and the like) performing the aforementioned function. The module may be stored in the memory and executed by the processor. The memory may be positioned inside or outside the processor and connected with the processor by various well-known means.

In the aforementioned exemplary system, methods have been described based on flowcharts as a series of steps or blocks, but the methods are not limited to the order of the steps of the present invention and any step may occur in a step or an order different from or simultaneously as the aforementioned step or order. Further, it can be appreciated by those skilled in the art that steps shown in the flowcharts are not exclusive and other steps may be included or one or more steps do not influence the scope of the present invention and may be deleted.

What is claimed is:

1. A method of performing cell selection performed by a terminal in a wireless communication system, the method comprising:

obtaining a public land mobile network (PLMN) list from a serving cell,
wherein the PLMN list enumerates a plurality of PLMNs based on operators sharing the serving cell, and
wherein the plurality of PLMNs include a primary PLMN and at least one secondary PLMN, and wherein the primary PLMN is the first enumerated in the PLMN list;
obtaining cell reselection information from the serving cell,
wherein the cell reselection information includes a plurality of enumerated cell reselection information sets associated with the plurality of PLMNs, wherein the cell reselection information is obtained separately from the PLMN list,
wherein the enumeration of the plurality of cell reselection information sets in the cell reselection information corresponds to the enumeration of the plurality of PLMNs in the PLMN list,
wherein the plurality of cell reselection information sets include one cell reselection information set associated with the primary PLMN and at least one cell selection information set associated with the at least one secondary PLMN, and
wherein each cell reselection information set includes parameters for performing cell reselection by the terminal based on at least one associated PLMN;
determining a cell reselection information set associated with a registered PLMN (rPLMN) of the terminal among the plurality of PLMNs,
wherein the rPLMN of the terminal is a PLMN that the terminal has registered a position of the terminal, and
wherein the determining is performed on the basis of an order according to which the plurality of PLMNs in the PLMN list are enumerated and according to which the plurality of cell reselection information sets in the cell reselection information are enumerated;
selecting a target cell by applying the cell reselection information set associated with the rPLMN; and
performing cell reselection on the basis of the target cell.

2. The method of claim 1, further comprising obtaining association information, wherein the association information specifies an association between the at least one secondary PLMN and the at least one cell reselection information set,
wherein the determining of the cell reselection information set associated with the rPLMN of the terminal determines the cell reselection information associated with the rPLMN of the terminal by using the association information.

3. The method of claim 1, wherein the at least one secondary PLMN is associated with one cell reselection information set.

4. The method of claim 1, wherein the at least one secondary PLMN and the at least one cell reselection information set are one-to-one mapped.

5. The method of claim 1, wherein the PLMN list is transmitted by being included in system information which is broadcast by the serving cell.

6. The method of claim 1, wherein the cell reselection information is transmitted by being included in system information which is broadcast by the serving cell.

7. The method of claim 1, wherein the cell reselection information is transmitted by being included in a radio resource control (RRC) connection release message transmitted when a connection between the serving cell and the terminal is released.

8. A wireless device operating in a wireless communication system, the wireless device comprising:

a radio frequency (RF) unit configured to transmit and receive a radio signal; and a processor operatively coupled to the RF unit, wherein the processor is configured to:

obtain a public land mobile network (PLMN) list from a serving cell, wherein the PLMN list enumerates a plurality of PLMNs based on operators sharing the serving cell, and wherein the plurality of PLMNs include a primary PLMN and at least one secondary PLMN, and wherein the primary PLMN is the first enumerated in the PLMN list;

obtain cell reselection information from the serving cell, wherein the cell reselection information includes a plurality of enumerated cell reselection information sets associated with the plurality of PLMNs, wherein the cell reselection information is obtained separately from the PLMN list, wherein the enumeration of the plurality of cell reselection information sets in the cell reselection information corresponds to the enumeration of the plurality of PLMNs in the PLMN list, wherein the plurality of cell reselection information sets include one cell reselection information set associated with the primary PLMN and at least one cell selection information set associated with the at least one secondary PLMN, and wherein each cell reselection information set includes parameters for performing cell reselection by the wireless device based on at least one associated PLMN;

determine a cell reselection information set associated with a registered PLMN (rPLMN) of the terminal among the plurality of PLMNs, wherein the rPLMN of the wireless device is a PLMN that the wireless device has registered a position of the wireless device, and wherein the determining is performed on the basis of an order according to which the plurality of PLMNs in the PLMN list are enumerated and according to which the plurality of cell reselection information sets in the cell reselection information are enumerated;

select a target cell by applying the cell reselection information set associated with the rPLMN; and perform cell reselection on the basis of the target cell.

* * * * *